(12) United States Patent
Jackowski et al.

(10) Patent No.: US 7,983,170 B2
(45) Date of Patent: Jul. 19, 2011

(54) IN-BAND QUALITY-OF-SERVICE SIGNALING TO ENDPOINTS THAT ENFORCE TRAFFIC POLICIES AT TRAFFIC SOURCES USING POLICY MESSAGES PIGGYBACKED ONTO DIFFSERV BITS

(75) Inventors: Steven J. Jackowski, Santa Cruz, CA (US); Seth K. Keith, Scotts Valley, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 576 days.

(21) Appl. No.: 11/613,073

(22) Filed: Dec. 19, 2006

(65) Prior Publication Data

US 2008/0144502 A1   Jun. 19, 2008

(51) Int. Cl.
*H04L 12/26* (2006.01)
(52) U.S. Cl. ......................................................... 370/237
(58) Field of Classification Search .................. 370/235, 370/392, 229, 237, 351, 389
See application file for complete search history.

(56) References Cited

U.S. PATENT DOCUMENTS

| | | | |
|---|---|---|---|
| 6,028,842 A | 2/2000 | Chapman et al. | |
| 6,104,700 A | 8/2000 | Haddock et al. | |
| 6,154,778 A | 11/2000 | Koistinen et al. | |
| 6,286,052 B1 | 9/2001 | McCloghrie et al. | |
| 6,430,154 B1 | 8/2002 | Hunt et al. | |
| 6,463,470 B1 | 10/2002 | Mohaban et al. | |
| 6,466,984 B1 | 10/2002 | Naveh et al. | |
| 6,570,851 B1 * | 5/2003 | Koskelainen et al. ......... | 370/231 |
| 6,621,793 B2 | 9/2003 | Widegren et al. | |
| 6,640,248 B1 | 10/2003 | Jorgensen | |
| 6,718,380 B1 | 4/2004 | Mohaban et al. | |
| 6,788,647 B1 | 9/2004 | Mohaban et al. | |
| 6,839,327 B1 * | 1/2005 | Zavalkovsky et al. ........ | 370/252 |
| 7,050,396 B1 * | 5/2006 | Cohen et al. .................. | 370/235 |
| 7,385,924 B1 | 6/2008 | Riddle | |
| 7,477,601 B1 * | 1/2009 | Waclawsky et al. .......... | 370/232 |
| 2002/0105942 A1 | 8/2002 | Ahmadi et al. | |
| 2002/0126675 A1 | 9/2002 | Yoshimura et al. | |
| 2002/0141339 A1 | 10/2002 | Konuma | |
| 2003/0053428 A1 * | 3/2003 | Park et al. ..................... | 370/329 |
| 2003/0067874 A1 | 4/2003 | See et al. | |
| 2003/0081613 A1 * | 5/2003 | Yamanaka ............... | 370/395.21 |
| 2004/0156380 A1 * | 8/2004 | Silverman et al. ............ | 370/428 |
| 2005/0021723 A1 | 1/2005 | Saperia | |
| 2005/0022189 A1 | 1/2005 | Proulx et al. | |
| 2005/0068942 A1 | 3/2005 | Chu et al. | |

(Continued)

*Primary Examiner* — Derrick W Ferris
*Assistant Examiner* — Omar Ghowrwal
(74) *Attorney, Agent, or Firm* — Foley and Lardner LLP; Christopher McKenna

(57) ABSTRACT

IP packets are scheduled at source devices such as cell phones on a private network that connect to the Internet at an edge device. A private traffic controller by the edge device detects pre-Internet congestion on the private network. The private traffic controller uses in-band piggybacked signaling of policy changes by intercepting return packets to the source devices and modifying bits such as DSCP bits in the header. Source traffic controllers in the source devices read the modified DSCP bits and implement specified policy changes, dropping or delaying packets at the source device before transmission. Congestion on RF links from cell phones is reduced by the source traffic controllers dropping packets before transmission. The source device limits or drops future packets in response to the policies signaled by the DSCP bits. Rather than indicate the existing packet's priority, private DSCP bits signal policy changes to the source device.

19 Claims, 11 Drawing Sheets

U.S. PATENT DOCUMENTS

| | | |
|---|---|---|
| 2005/0078171 A1 | 4/2005 | Firestone et al. |
| 2005/0117576 A1 | 6/2005 | McDysan et al. |
| 2005/0135243 A1 | 6/2005 | Lee et al. |
| 2005/0135378 A1* | 6/2005 | Rabie et al. .............. 370/395.21 |
| 2005/0195741 A1 | 9/2005 | Doshi et al. |
| 2005/0237968 A1 | 10/2005 | Womack et al. |
| 2005/0249220 A1 | 11/2005 | Olsen et al. |
| 2006/0002370 A1 | 1/2006 | Rabie et al. |
| 2006/0029063 A1* | 2/2006 | Rao et al. ..................... 370/389 |
| 2006/0165103 A1 | 7/2006 | Trudeau et al. |
| 2006/0215556 A1* | 9/2006 | Wu et al. ....................... 370/230 |
| 2006/0221990 A1 | 10/2006 | Muller et al. |
| 2006/0239283 A1* | 10/2006 | Fitzgerald .................... 370/401 |
| 2006/0245423 A1 | 11/2006 | Best et al. |
| 2006/0246900 A1 | 11/2006 | Zheng |
| 2007/0021139 A1* | 1/2007 | Baker et al. ................... 455/522 |
| 2007/0064684 A1* | 3/2007 | Kottilingal ................... 370/355 |
| 2007/0097130 A1 | 5/2007 | Margulis |
| 2007/0147363 A1* | 6/2007 | Oswal et al. .................. 370/389 |

* cited by examiner

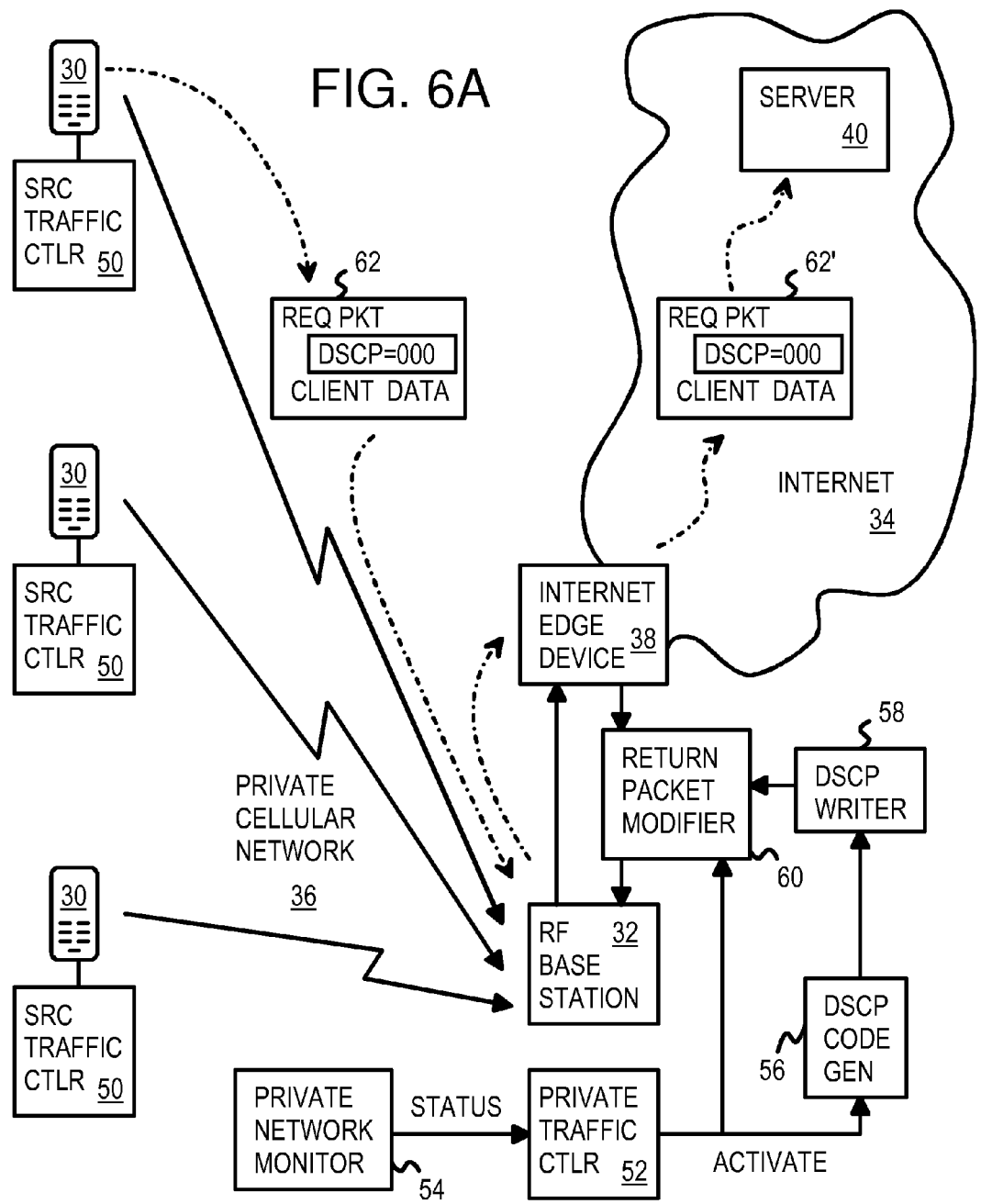

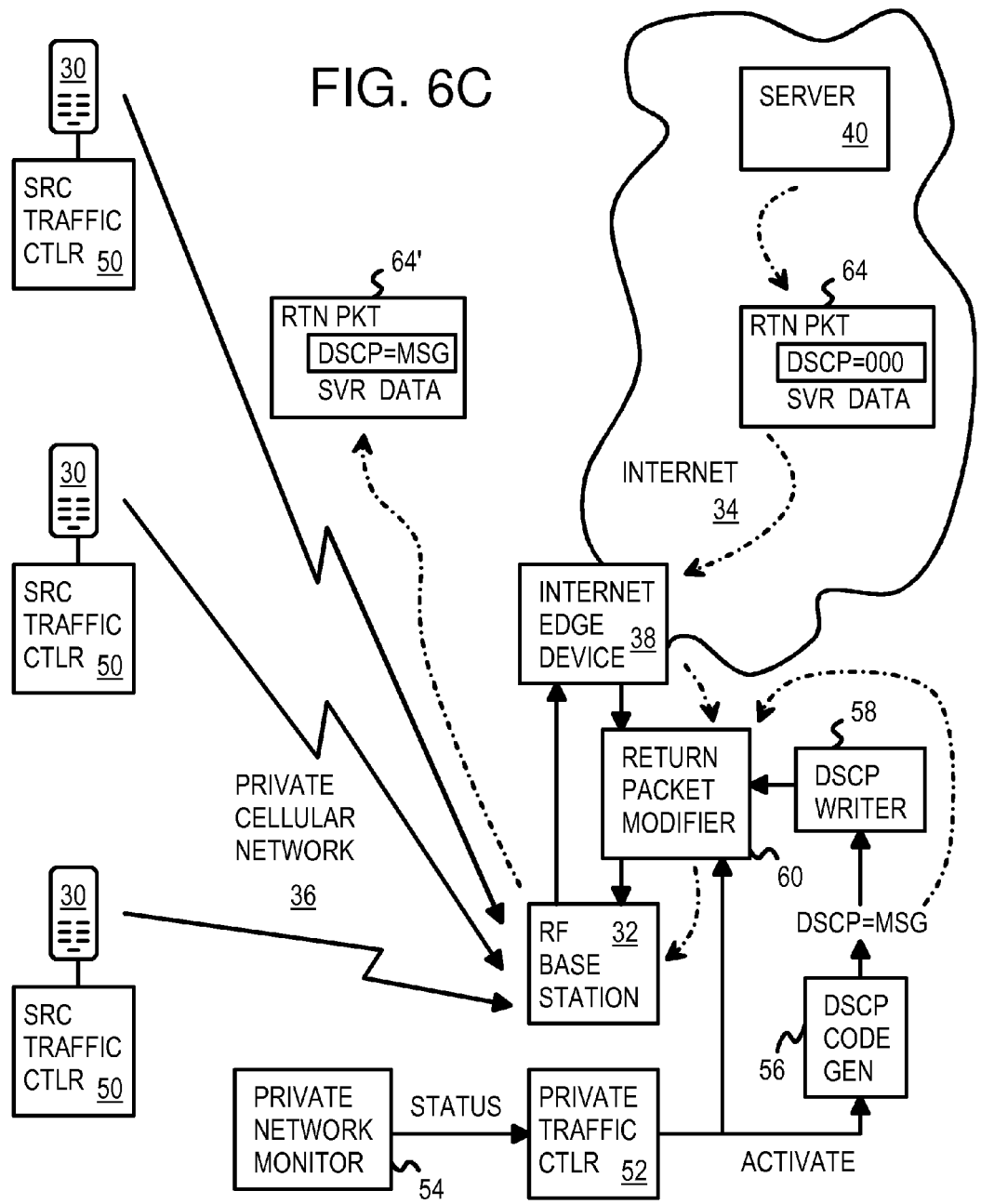

IN-BAND QUALITY-OF-SERVICE SIGNALING TO ENDPOINTS THAT ENFORCE TRAFFIC POLICIES AT TRAFFIC SOURCES USING POLICY MESSAGES PIGGYBACKED ONTO DIFFSERV BITS

FIELD OF THE INVENTION

This invention relates to network traffic control, and more particularly to in-band signaling to traffic sources for source control.

BACKGROUND OF THE INVENTION

Networks such as the public Internet and private cellular networks carry data that is encapsulated by packets that are switched through the networks. As user applications become more sophisticated, the amount of data increases, such as to carry video rather than just voice. Networks tend to get swamped by such increases in traffic. Intermediate switches or routers may be overwhelmed by the number of packets received and may be forced to drop some of the packets.

Various traffic control techniques have been implemented. Rather than just drop packets randomly, traffic classes can be established. Packets for a lower-priority traffic class are dropped, while packets with higher-priority traffic classes are passed through a congested router. Thus the limited bandwidth of a congested router can be reserved for higher-priority traffic. The Quality-of-Service (QoS) for higher-priority packets can be improved.

Quality of Service (QoS) ensures that traffic receives the correct attention in a network. Inherently, the Internet fairly shares network resources on a packet-by-packet basis. However, different types of traffic may need different levels of service. Unfortunately the type of traffic is not visible on a packet by packet basis. Quality of Service encompasses a variety of traffic characteristics and control methods. Priority, maximum bandwidth, minimum bandwidth, latency, jitter, and error rates are parameters for QoS.

FIG. 1 shows a prior-art router that drops packets based on QoS rules. Router 10 is an intermediate node in a network such as the Internet and receives Internet Protocol (IP) packets 12, and routes these IP packets to other routers or devices along paths toward the packets' destinations.

Sometimes router 10 receives more incoming IP packets 12 than it can process. Router 10 may have an input buffer or queue that can store a limited amount of data. When too many IP packets 12 are received in a short period of time, this input buffer can fill up, and any additional IP packets are lost since there is no more room in the input buffer. Even when the input buffer does not overflow, packets entering the input buffer may be significantly delayed.

To prevent this input-buffer overflow, router 10 implements a traffic policy to guarantee a Quality-of-Service (QoS) for some higher-priority packets. QoS rules 14 are received from a centralized QoS traffic controller that monitors network traffic and issues updated to QoS rules 14 as network conditions change. For example, when there is no congestion on the network, QoS rules 14 may instruct router 10 to pass all IP packets 12 through. However, when some network congestion is detected, QoS rules 14 may be updated, causing router 10 to drop packets that have the lowest priority level, while passing higher-priority IP packets 12 to its output.

Using QoS rules helps to ensure that higher-priority packets are provided with a higher level or quality of service. For example, streaming data such as voice or video transmissions, or traffic from users who pay a premium for premium service, may have packets marked for a higher level of service than data packets for web browsing or for text messages that may be safely delayed.

FIGS. 2A-B show IP packets marked for service levels. FIG. 2A shows an older IP version 4 (IPv4) packet. IPv4 packet 20 carries data in data field 136 that is preceded by an IP header. Data field 136 may contain headers for higher-level protocols, such as a Transport-Control-Protocol (TCP) header. Version field 122 indicates the IP version that packet 20 is using. Length field 124 indicates the packet's length, while source IP address field 132 contains the IP address of the packet's source or sender, while destination IP address field 134 contains the IP address of the packet's destination or ultimate receiver. These IP addresses may be altered such as to hide the sender's true IP address behind a firewall, or to redirect or load-balance destination servers.

Checksum field 128 contains a cyclical-redundancy-check (CRC) checksum of packet 20 that is useful for detecting errors. Flags 126 contain various flags.

Type-of-service TOS field 26 is used to indicate the service level or priority. A widely used QoS protocol is Differentiated Services (DiffServ), which uses 6 bits in TOS field 26 that are known as the Differentiated Services Code Point (DSCP) bits. The DSCP bits 22 in TOS field 26 can be set to certain predefined values to indicate the packet's traffic level or priority.

For example, DSCP bits 22 in TOS field 26 can be set to indicate a lowest priority, which is the default. A router uses its best efforts to pass a packet with this default service level. A higher level of service is expedited forwarding, while assured forwarding is an even higher level of service. Packets marked for assured forwarding are much more likely to be processed through a router than default packets, which are most likely to be dropped when congestion occurs.

DSCP bits 22 in TOS field 26 can be set to other values, such as for class selector per-hop-behaviors (PHB's) that can more precisely control service at certain routers.

FIG. 2B shows a newer IP version 6 (IPv6) packet. IPv6 packet 24 carries data in data field 136, and also has version field 122, length field 124, source IP address field 132, and destination IP address field 134. Flow label field 142 and next header field 146 allow for expanded functionality.

Traffic class field 144 contains DSCP bits 22, much as TOS field 26 did for IPv4 packet 20. The traffic class or priority of this packet can be set by DSCP bits 22 in traffic class field 144. Hop limit field 148 can be used for limiting hops, which can also be used to network control traffic.

FIG. 3 shows pre-Internet congestions despite QoS traffic control on the Internet. Traffic control using QoS rules and DiffServ setting of DSCP bits 22 in traffic class or type-of-service bytes in IP packets can help to manage traffic within Internet 34. Traffic controller 33 monitors traffic and congestion and sends policy packets 35 to devices such as router 10 and edge device 38 to regulate traffic. Policy packets 35 can set QoS rules that indicate when to drop packets and what traffic classes to process.

QoS policies may be implemented in two distinct entities: a policy decision point (PDP) and a policy enforcement point (PEP). In practice, these are often run in the same physical device, such as in a traffic controller. Traffic controller 33 is a Policy Decision Point (PDP) while routers and edge devices act as Policy Enforcement Points (PEP).

While such traffic control is effective in handling congestion on Internet 34, sometimes congestion can occur in locations that are not controlled by traffic controller 33. For example, private cellular network 36 has thousands of cell phones 30 that send packets by radio-frequency (RF) transmission to base stations 32. Base station 32 reformats these packets and sends them to edge device 38, where the packets enter Internet 34. The packets are then routed through Internet 34.

Intermediate devices such as router 10 and edge device 38 can regulate packets from cell phones 30 using QoS rules, but only once these packets reach Internet 34. When too many packets are sent from cell phones 30, packets are dropped as they enter Internet 34, at edge device 38. However, these packets still pass between cell phones 30 and base station 32 before reaching edge device 38, causing congestion on the RF links. This pre-Internet congestion on private cellular network 36 is undesirable, since voice calls may be blocked by IP packets to edge device 38 that are ultimately dropped.

RF bandwidth is wasted by these dropped packets. Cell phones 30 may simply re-transmit these packets over and over again, clogging the RF links with packets that are ultimately dropped by the Internet edge device anyway.

FIG. 4 shows that a virtual-private-network (VPN) tunnel can frustrate traffic control. Encryptor 42 on cell phones 30 or on another device before the Internet edge device may encrypt data in IP packets. The encrypted IP packets are sent over the Internet and routed by router 10 and others to server 40, the destination. Server 40 decrypts the data in the IP packets using decryption software 44.

Encrypting the data in IP packets prevents others from reading the encrypted data. However, some higher-level headers may be included in the data field that is encrypted. These higher-level protocols may include information such as the name or type of application program, a higher-level port, or flow information that may be useful in classifying the IP packets into traffic classes. A traffic classifier that looks for such information to classify the IP packet by writing DSCP bits 22 using DiffServ may not be able to classify encrypted packets, and may use the lowest-priority default setting.

When the traffic classifier examines packets within the VPN tunnel, after encryptor 42, information from these higher-level protocols can be hidden, preventing proper classification. Intermediate routers such as router 10 are forced to use default priority settings, or must guess at the traffic class of these packets. Thus intermediate traffic control, such as within Internet 34 of FIG. 3, may be thwarted by packet encryption.

What is desired is a traffic control mechanism that is effective despite packet encryption and VPN tunnels. A traffic controller that can control traffic on both the Internet and on pre-Internet private networks is desirable. A traffic controller that adjusts packet traffic at the source is desirable to avoid bandwidth wasted by transmission of packets that are later dropped.

BRIEF DESCRIPTION OF THE DRAWINGS

FIGS. 6A-D illustrate source-based traffic control using in-band signaling of return packets.

DETAILED DESCRIPTION

The present invention relates to an improvement in pre-Internet traffic control. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that congestion on private networks before reaching the edge of the Internet can be a problem even when Internet traffic control methods such as QoS and DiffServ are deployed. Standard traffic control methods do not reach back into these private networks. The inventors realize that controlling traffic at the source of the traffic can relieve pre-Internet congestion as well as Internet congestion.

The inventors further realize that generating additional policy packets to control traffic is counter-productive, since the additional policy packets add to the congestion. Instead, in-band signaling of policy using existing packets is desirable, since no additional packets are sent to signal policy changes. A further improvement to in-band signaling is to piggyback the policy information so that the sizes of the packet do not have to increase. Policy changes are signaled in-band by using existing packets. Policy changes are further piggybacked by setting traffic control bits in the packets. The DSCP bits are used for this signaling, not to set the existing packet's priority, but to signal the source device without using additional bandwidth. The source device then limits or drops future packets in response to the policies signaled by the DSCP bits.

The standard use of DSCP bits is to indicate the priority of the current packet carrying DSCP bits. Each QoS router reads these DSCP bits from the current packet as that QoS router is switching the current packet. The inventors realize that the DSCP bits can be used in a different way—to send a message back to the source of the packets, to instruct the source to stop or reduce transmission rates of future packets.

Figure 1:
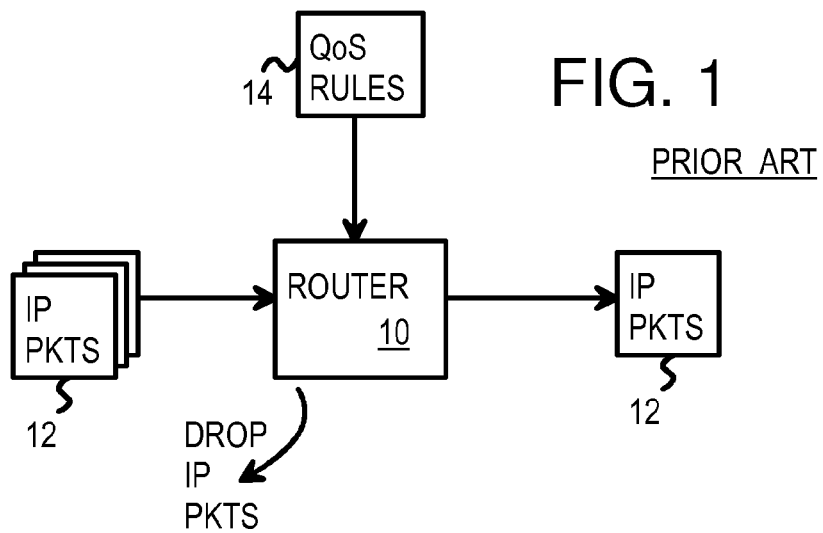
FIG. 1 shows a prior-art router that drops packets based on QoS rules.
Figure 2A:
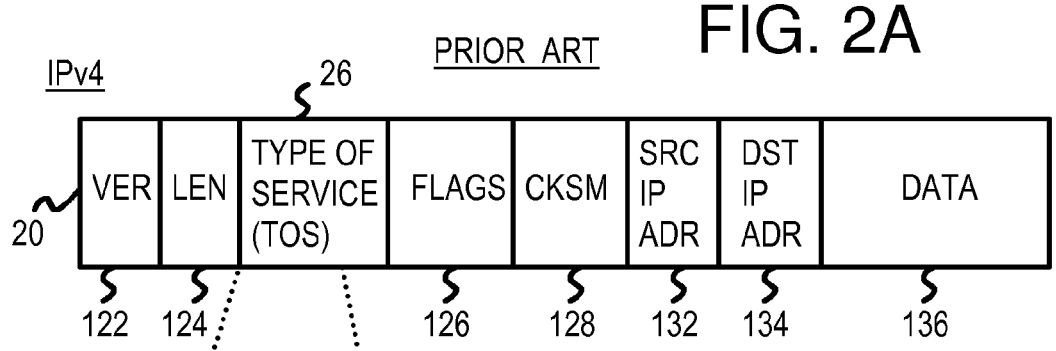
FIGS. 2A-B show IP packets marked for service levels.
Figure 2B:
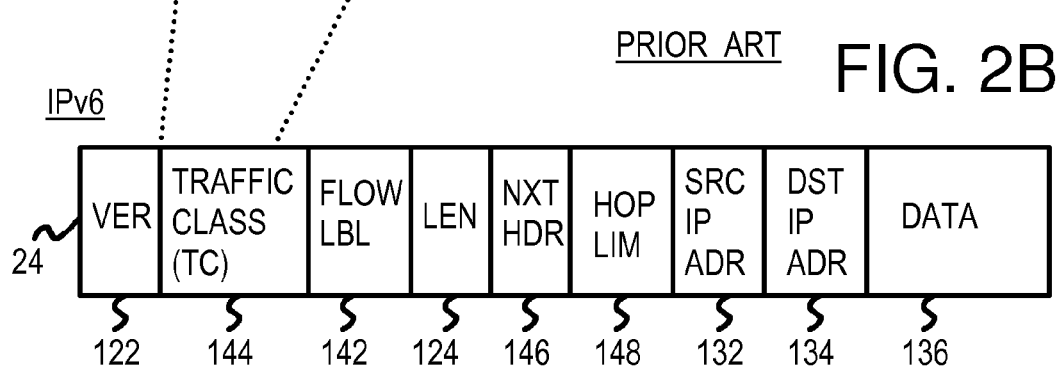
Figure 3:
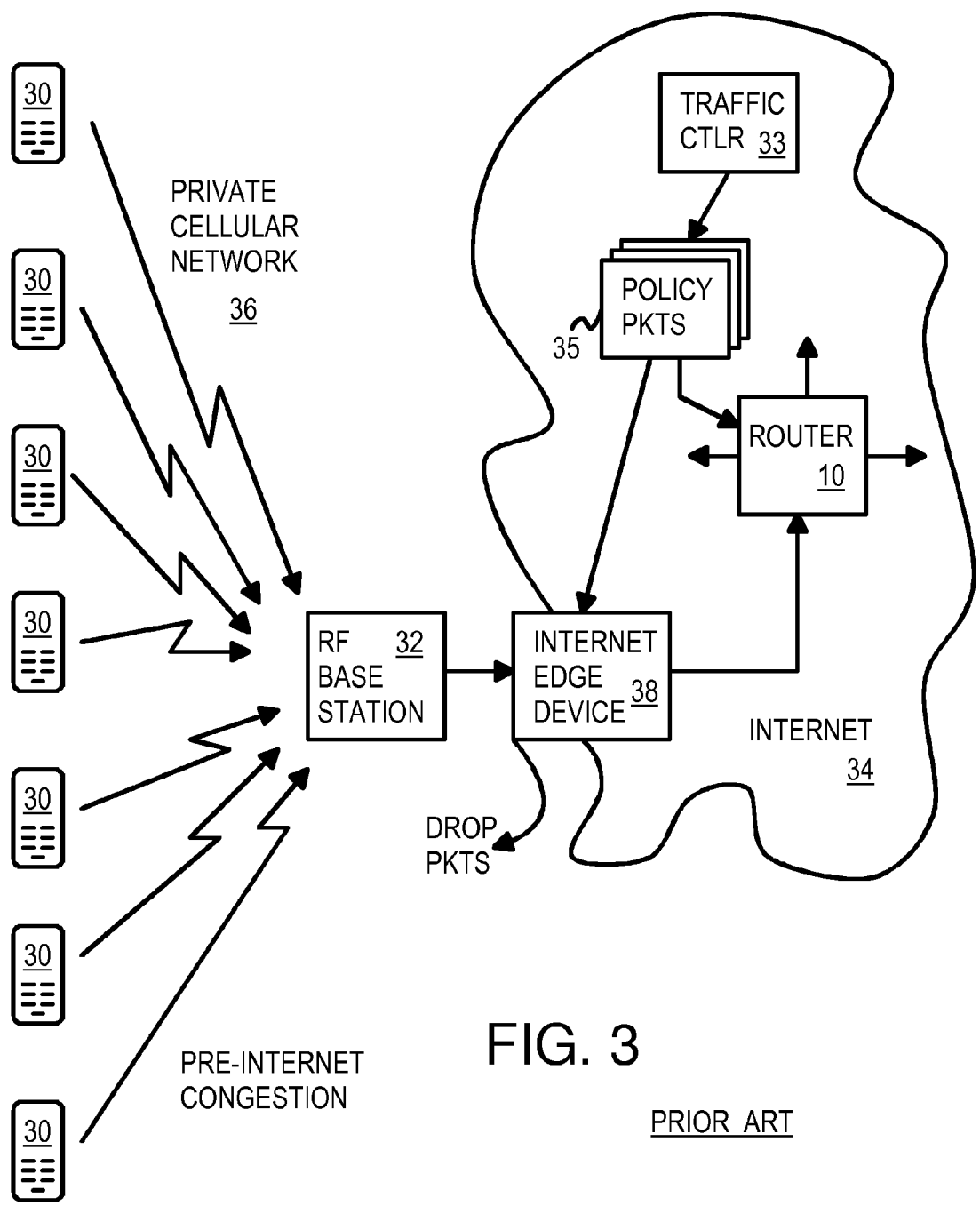
FIG. 3 shows pre-Internet congestions despite QoS traffic control on the Internet.
Figure 4:
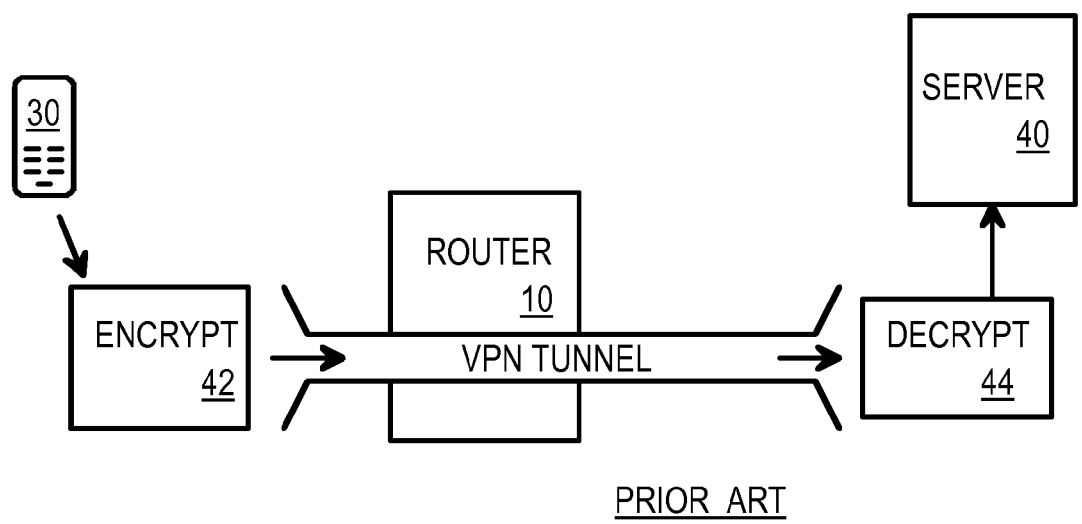
FIG. 4 shows that a virtual-private-network (VPN) tunnel can frustrate traffic control.
Figure 5:
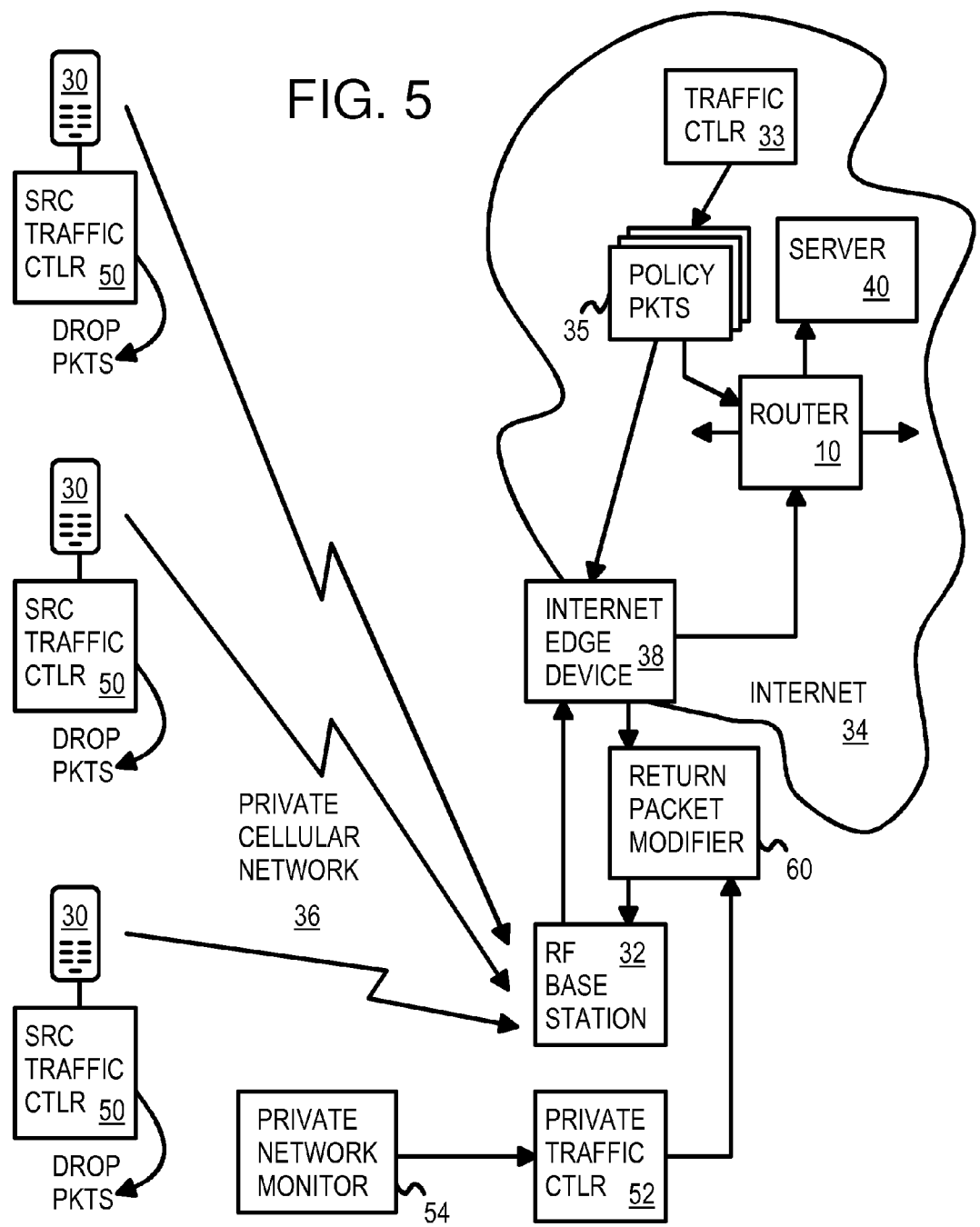
FIG. 5 highlights source traffic control.

FIG. 5 highlights source traffic control. Source traffic controllers 50 are installed on cell phones 30, which are the source devices that generate packets sent over private cellular network 36 and Internet 34 to server 40 and other servers. Source traffic controllers 50 can be activated to drop packets before being transmitted over RF links to base station 32 by in-band signaling. Return packets from server 40 back to cell phones 30 are intercepted by return packet modifier 60, which sets DSCP bits in the return packets. When the modified return packet reaches cell phones 30, source traffic controllers 50 detect the set DSCP bits and extract the traffic-control instructions. Traffic-control instructions can cause source traffic controllers 50 to drop future packets, to change the priorities of packets, to adjust latencies and jitter, and to provide for bandwidth limits and guarantees. Back-pressure can be applied to the source applications, causing source applications to reduce packet transmission rates.

Once congestion on private cellular network 36 eases as more cell phones 30 drop or delay packets before transmission, private network monitor 54 detects the reduction in congestion, and signals the spare bandwidth to private traffic controller 52. Private traffic controller 52 adjusts the current policies on private cellular network 36 and instructs return packet modifier 60 to intercept return packets to cell phones 30. Return packet modifier 60 sets DSCP bits in these return packets, and when these return packets are received by cell phones 30, their source traffic controllers 50 read the DSCP bits and adjust their traffic policies. For example, the policy may be adjusted so that source traffic controllers 50 no longer drop or delay packets.

The flow of packets over private cellular network 36 and into Internet 34 is controlled at the source of the packets, on cell phones 30. Source traffic controllers 50 can drop or delay packet transmission, freeing up bandwidth on the RF links to base station 32. Congestion is also reduced at downstream locations, such as at edge device 38 and router 10 on Internet 34.

This private traffic control can co-exist with prior-art QoS signaling that controls traffic within Internet 34. Traffic controller 33 generates policy packets 35 that are sent to router 10, edge device 38, and other devices within Internet 34 to signal QoS policies to implement using prior-art QoS signaling and traffic control. However, such prior-art QoS signaling is not effective at controlling traffic on private cellular network 36 since this is a private network before edge device 38.

Figure 6B:
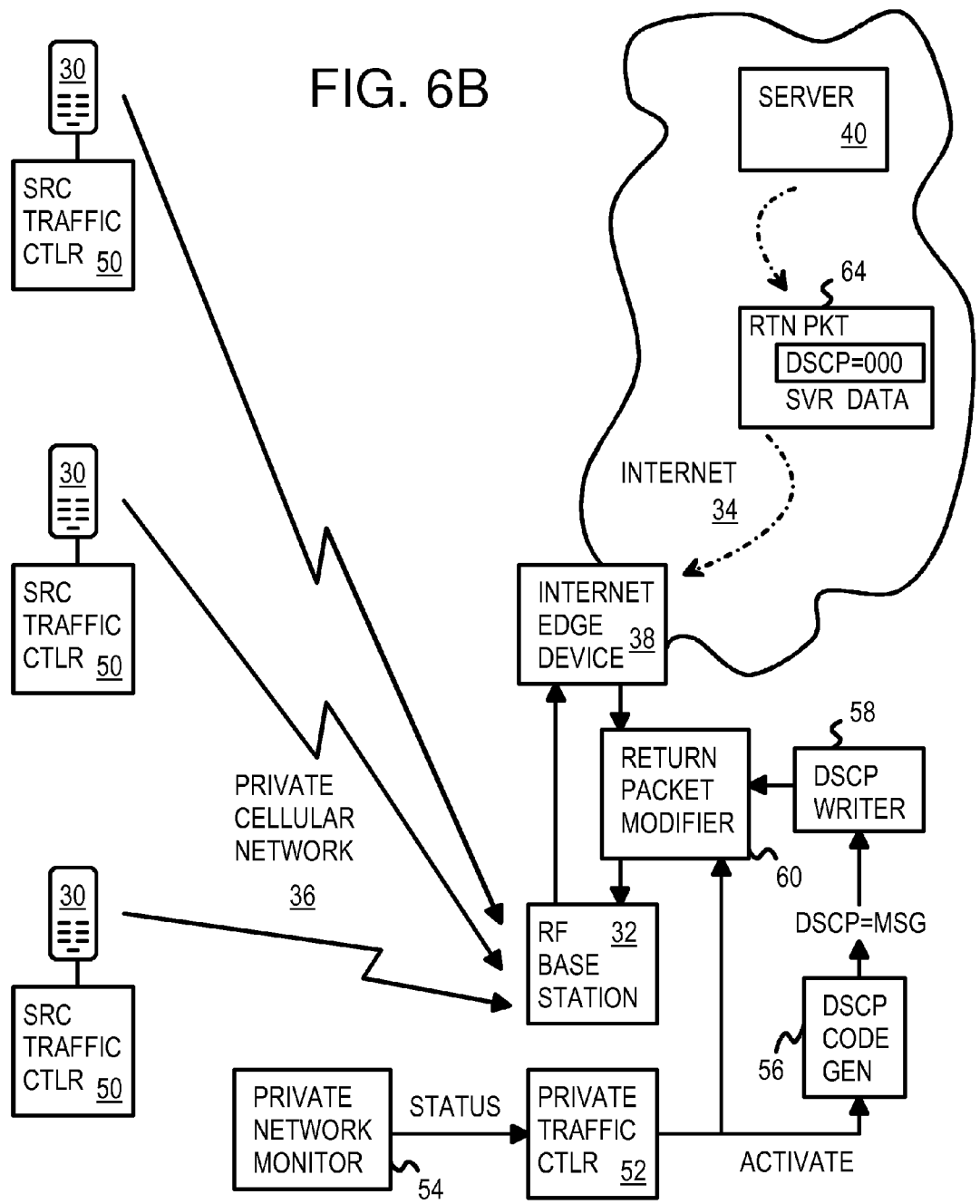

FIGS. 6A-D illustrate source-based traffic control using in-band signaling of return packets. In FIG. 6A, a microbrowser or other application running on cell phone 30 generates a request that causes request packet 62 to be sent across RF links to base station 32. The DSCP bits in request packet 62 are set to a default value, indicating that request packet 62 has a low priority for QoS-enabled routers such as router 10. Client data such as a cookie, query data, account information, etc. may be included in request packet 62. More than one request packet 62 may be sent, and several request and return packets may be exchanged with server 40.

Base station 32 receives request packet 62 and forwards it to edge device 38, which sends request packet 62' through Internet 34 to server 40, the destination of request packet 62. Some modification of request packet 62 may occur during routing.

Congestion on private cellular network 36 is detected by private network monitor 54. A status indicating the congestion is sent from private network monitor 54 to private traffic controller 52. Private traffic controller 52 responds to the congestion by imposing tighter policy restrictions on cell phones 30. Return packet modifier 60 is activated by private traffic controller 52 to modify return packets to cell phones 30 to send the new policy to source traffic controllers 50. Return packet modifier 60 waits for a return packet to arrive from Internet 34.

In FIG. 6B, server 40 responds to the client requests in request packet 62' by generating server data that is encapsulated in one or more return packets 64. Return packet 64 has its destination address set to the source IP address from request packet 62' which is for one of cell phones 30. Return packet 64 is routed through routers in Internet 34 and arrives at edge device 38 as it exits Internet 34 and enters private cellular network 36.

In FIG. 6C, private traffic controller 52 activates DSCP code generator 56 to generate an in-band message to cell phones 30 to implement the new traffic policy. A special encoding of the 6 DSCP bits carries the message about the new traffic policy. When return packet 64 passes through edge device 38, it is sent to return packet modifier 60. DSCP writer 58 over-writes the DSCP bits in return packet 64 with the message MSG from private traffic controller 52. Modified return packet 64' is sent from return packet modifier 60 to base station 32, and is transmitted over the RF links of private cellular network 36 to cell phone 30.

Figure 6D:
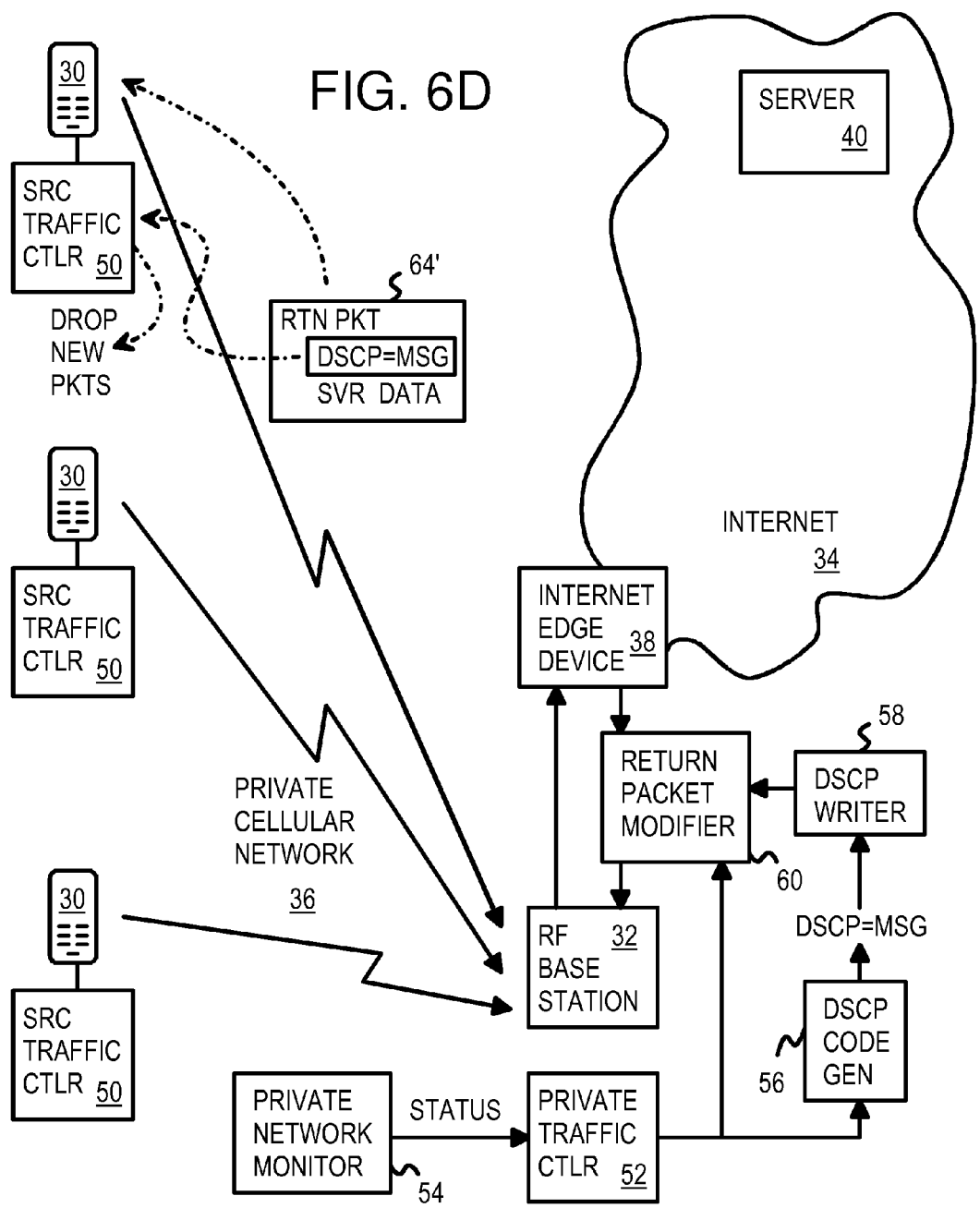

In FIG. 6D, cell phone 30 receives modified return packet 64' with message MSG in the DSCP bits. The server data in return packet 64' is sent to the application that requested the server data. Source traffic controller 50 detects that the DSCP bits contain message MSG, since the DSCP bits are marked as a "private DSCP". Source traffic controller 50 decodes the embedded message MSG, and implements the new traffic policy.

For example, message MSG may indicate to drop all data packets, but allow voice packets. Any data packets generated in the future by applications on cell phone 30 are dropped or prevented from being transmitted by source traffic controller 50. Voice packets may continue to be transmitted.

Alternately, the message may limit the bandwidth used by cell phone 30. The policy may indicate a number of packets or aggregate size of data that may be transmitted by cell phone 30 over a period of time such as 1 second. Once the limit is reached, Source traffic controller 50 blocks further packet transmission until the 1 second time limit has expired.

Policies can be triggered for congestion control, to give different levels of service to users or applications, and to provide better network control by the users or by the network operators. The policies themselves may differ on different source endpoints. Policies may include bandwidth limits, guarantees, or priorities for the user, system, application. Policies may also include priorities to certain destinations (such as favoring the servers at the carrier as opposed to those on the Internet), latency guarantees, jitter controls. Policies may also block destinations, applications, and certain traffic types (e.g. broadcast traffic). Policies may include requests for additional bandwidth or access permissions, and may limit the number of sessions from this host. Many other policies could be implemented.

Other return packets to other cell phones 30 could also be intercepted by return packet modifier 60 and modified with message MSG, causing the bandwidth used by cell phones 30 to decrease as more and more cell phones implement the new traffic policy. Some cell phones 30 may not be transmitting request packets and thus may not receive return packets with the new policy; however, since they are not generating traffic, not receiving the new traffic policy has little effect on the bandwidth usage. Cell phones that are actively sending packets and causing the congestion are throttled back more rapidly than other cell phones that are just sending requests sporadically. Thus private traffic controller 52 tends to target the sources that are causing the congestion.

Private traffic controller 52 could also specify that some cell phones are signaled with the new policy while other cell phones are not signaled. A destination IP-address filter in return packet modifier 60 can identify which return packets to modify. Cell phones for users on a premium service plan could be allowed to continue with a less restrictive traffic policy while cell phones for lower-cost plans could receive return packets with the new restrictive policy.

Figure 7:
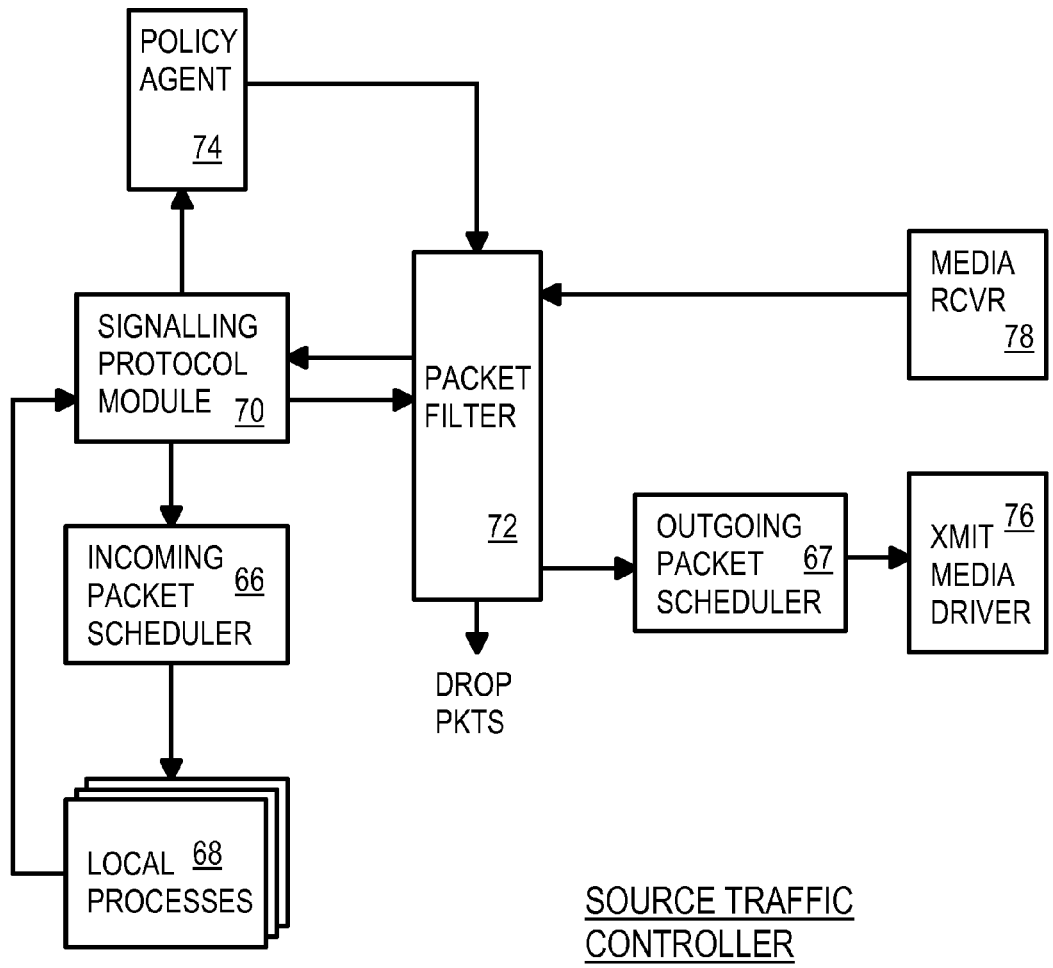
FIG. 7 is a block diagram of a source traffic controller.

FIG. 7 is a block diagram of a source traffic controller. Source traffic controller 50 can intercept inbound and outbound packets. Inbound packets (such as return packets from servers) are received by media receiver 78 and pass through packet filer 72. Signaling protocol module 70 reads the DSCP bits in the header of each inbound packet and compares the values of the DSCP bits to pre-defined values. Sometimes the DSCP bits match values defined by DiffServ or other public protocols, and these DSCP values are ignored by signaling protocol module 70, and the packets are passed on to incoming packet scheduler 66 to be sent to one of local processes 68 that are running on the local client device (such as cell phone 30). An application table may be used by incoming packet scheduler 66 to associate incoming packets with applications and their local processes 68, such as by matching ports or sockets from higher-level headers in the data field.

When the DSCP bits match proprietary values defined by the private traffic controller, signaling protocol module 70 decodes these DSCP bits to re-generate the message that was sent by private traffic controller 52 (FIGS. 5, 6). This message may set, clear, or modify a current policy that is implemented by policy agent 74. For example, the message may be to stop all outgoing data packets.

Once the DSCP bits are read, signaling protocol module 70 passes the incoming packet to incoming packet scheduler 66 to be sent to one of local processes 68. The server data in the return packet can be sent to the requesting application.

When one or more local processes 68 generates a request packet to be sent out as an outgoing packet, the request packet is sent to signaling protocol module 70. When an acknowledgement message needs to be sent back to private traffic controller 52, signaling protocol module 70 writes the acknowledgement message into the DSCP bits of the outgoing packet. The outgoing packet is sent from signaling protocol module 70 to packet filter 72.

Packet filter 72 is used by policy agent 74 to enforce policies that have been set by messages received in return packet that were intercepted by private traffic controller 52. A policy to block all data packets is implemented by policy agent 74 causing packet filter 72 to pass through voice packets, but drop all data packets. Packet filter 72 can perform packet classification. In a source-based system, the applications that generate the traffic can be seen so that packet filter 72 may not need to perform stateful inspection to identify types of traffic. A policy to limit the number of packets transmitted per time unit could increment a counter for each packet sent, and then drop all packets after the counter reached the packet limit. Policy agent 74 or another process could clear the counter at the end of each time unit.

A policy to drop all packets to a certain range of IP address could cause packet filter 72 to examine the destination IP addresses, and drop packets matching the prohibited range of IP addresses. Another policy might block all packets from a certain high-level application that is identifiable by a port used by that application. Packet filter 72 can scan packets for this port, and drop packets with the matching port. A table that contains secondary information of each outgoing packet, such as port numbers or application names, may be generated by local processes 68 and examined by packet filter 72.

Policy data may specify that an action be applied to all outgoing traffic, all incoming traffic, packets for a specific application, for a specific flow of packets, to a specific port such as a TCP port, or to a specific destination port or IP address. Policy data may simple turn on or off a specific policy, or may specify a group of policies to enable or disable together.

When packet filter 72 causes packet scheduler 67 drop packets, the packets are deleted and not transmitted. Packets that pass successfully through packet filter 72 are sent to outgoing packet scheduler 67, which can re-order packets for transmission by transmit media driver 76. Transmit media driver 76 can re-frame and re-format the packets for transmission over the physical media, such as RF links, cable, twisted pair, or other kinds of media.

Figure 8:
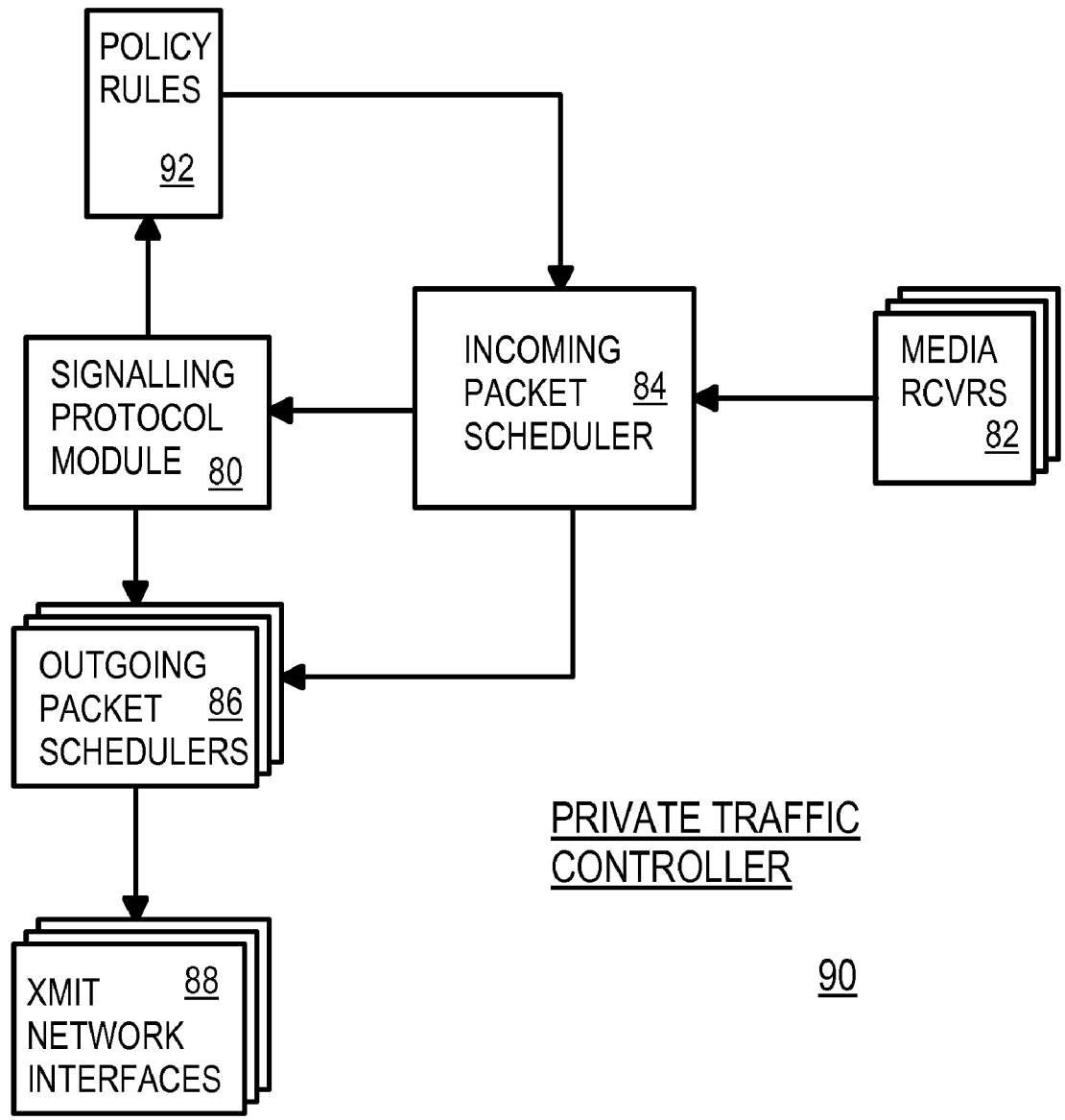
FIG. 8 is a block diagram of a private traffic controller.

FIG. 8 is a block diagram of a private traffic controller. Private traffic controller 90 can sit on a private network, such as just before an Internet edge device, after a base station, or an any of a number of other points within the private network.

A private network monitor may be located at the same location as the private traffic controller, or may be located at one or more other locations within the private network.

When a change in the status of the private network is detected by the private network monitor, private traffic controller 90 is signaled of the change. Policy rules module 92 examines the status change and decides which policy rules to implement at source traffic controllers 50. When a policy rule needs to be changed, policy rule module 92 instructs incoming packet scheduler 84 to direct return packets to signaling protocol module 80. All packets could pass through signaling protocol module 80, or only those packets with matching criteria, such as a destination IP address matching an IP address for one of source traffic controllers 50 that need to be updated.

Signaling protocol module 80 over-writes the DSCP bits with the policy-updating message for return packets destined to the source devices having source traffic controllers 50 that are to implement the policy change. The modified return packets are sent from signaling protocol module 80 to outgoing packet schedulers 86 to be transmitted by transmit network interfaces 88 to the next hop in their return paths.

When acknowledgement messages are generated by source traffic controllers 50 in response to the policy-updating messages, media receivers 82 can receive both request and return packets from the source devices. Request packets from the source devices can be sent from incoming packet scheduler 84 to signaling protocol module 80, which reads the acknowledgement messages in the DSCP bits, and clears the DSCP bits before the request packets are sent to outgoing packet schedulers 86 for transmission to the destination server on the Internet.

A state table with entries for each one of source traffic controllers 50, or many state machines may be kept by signaling protocol module 80 to track the policy-updating messages and acknowledgements for each source device.

In a simple embodiment, a single message is sent in a single return packet 64' to each cell phone to activate or adjust traffic policy enforced by its source traffic controller 50. Since there are only 6 DSCP bits, and some values of these bits are used by DiffServ and other existing standards, the number of values that can be encoded by the 6 DSCP bits is limited to perhaps less than 16 There may be more possible policies than there are available encodings of the DSCP bits. Some policies may specify certain applications or certain cell phones, and be fairly complex to specify.

In the simple embodiment, no acknowledgement is returned from source traffic controllers 50 after they receive the message and set the new traffic policy. The lack of acknowledgement may be acceptable for private networks with many sources. However, having source traffic controller 50 return an acknowledgement after setting a new policy can enhance effectiveness. Source traffic controllers 50 can set DSCP bits in the next outgoing request packet 62 to indicate the acknowledgement. Return packet modifier 60 or private traffic controller 52 can examine outbound packets such as request packet 62 for acknowledgement messages encoded in the DSCP bits, and can clear the DSCP bits before sending request packet 62 to edge device 38.

Multiple return packets 64 to each cell phone may be modified, allowing more information to be sent from private traffic controller 52 to each source traffic controller 50. Acknowledgement messages encoded in DSCP bits may be sent from source traffic controller 50 to private traffic controller 52.

Figure 9:
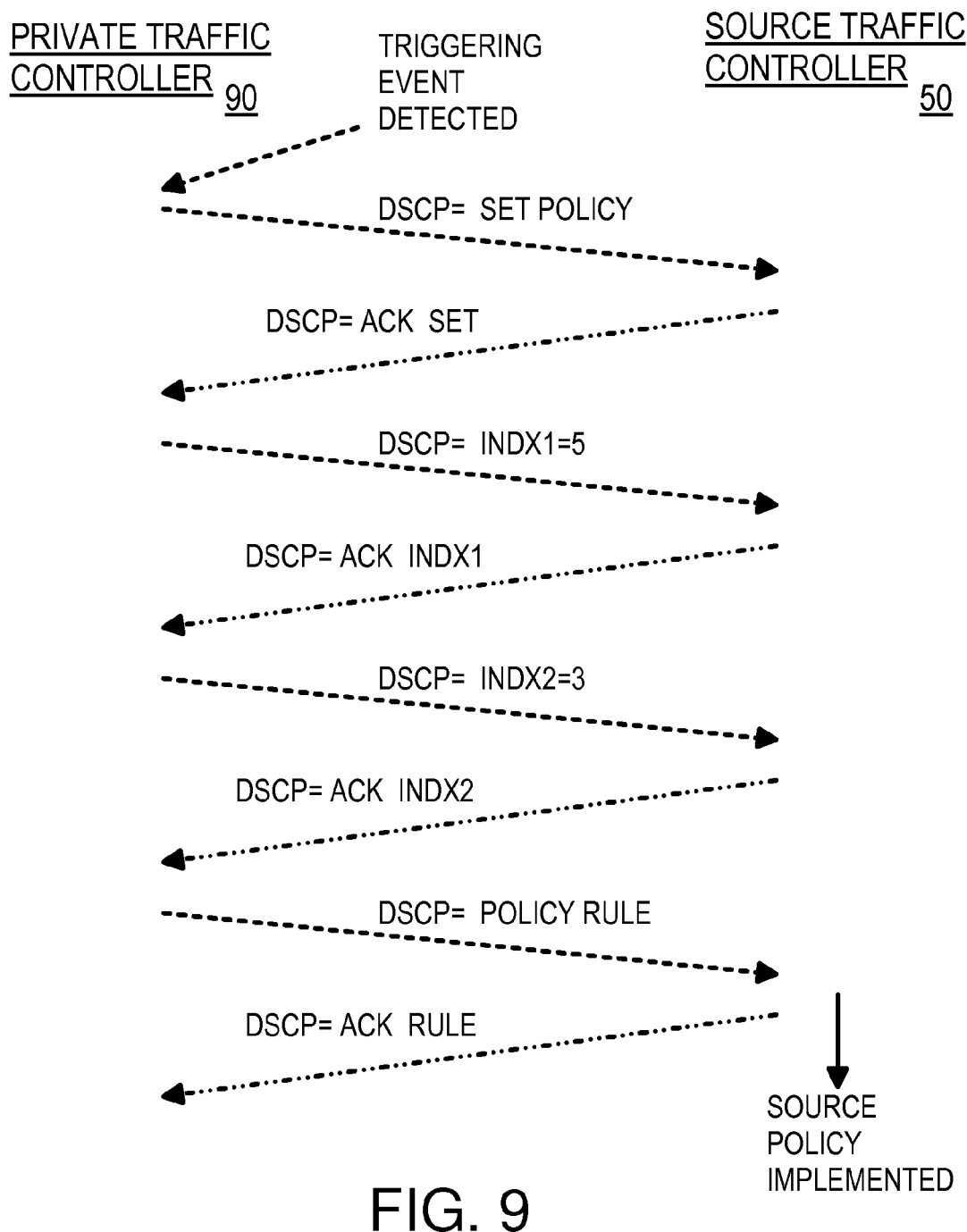
FIG. 9 is a flow diagram of messages being exchanged between a source traffic controller and the private traffic controller.

FIG. 9 is a flow diagram of messages being exchanged between a source traffic controller and the private traffic controller. A triggering event is detected by the private network monitor, such as congestion, increased packet latency, buffer overflows or near-overflows, high numbers of dropped packets, etc. Private traffic controller 90 is notified and chooses a new policy to counteract the network condition. Since there are relatively few DSCP bits, a sequence of messages are sent to each source traffic controller 50, and each source traffic controller 50 responds with acknowledgement messages. Note that this flow can be repeated for many other source traffic controllers 50, and handshake states separately maintained for each source traffic controller 50. The flow of FIG. 9 can be repeated, or preformed in parallel, for many source traffic controllers 50.

When a return packet to the device with the particular source traffic controller 50 is detected by private traffic controller 90, the return packet is intercepted and its DSCP bits modified to carry a first message, Set_Policy. This first message is carried to source traffic controller 50 by this first return packet. Other return packets after this first return packet are not intercepted by pass through unmodified while private traffic controller 90 monitors outbound packets with the same source IP address as source traffic controller 50. When such an outbound packet is detected with the matching source IP address, its DSCP bits are read. Some outbound packets may have default DSCP values used by DiffServ, and these packets are ignored and passed on and routed to the destination server. When an outbound packet with the matching source IP address has DSCP bits set for a message that is decoded by private traffic controller 90, this message is processed and the DSCP bits are cleared in the outgoing packet, which continues on toward its destination.

Private traffic controller 90 looks for an acknowledgement message in outgoing packets that acknowledges the Set_Policy message, such as an Ack_Set message in the DSCP bits. Once this acknowledgement messaged is received, private traffic controller 90 intercepts another return packet with the destination IP address matching source traffic controller 50, and changes the DSCP bits in this second return packet to indicate a first index value, such as INDX1=5.

When source traffic controller 50 receives the second return packet, it extracts the message INDX1=5 and stores 5 for the value of index 1. Source traffic controller 50 generates an acknowledgement message for index 1, Ack_Indx1, and embeds it into another outgoing request packet, which is intercepted by private traffic controller 90.

Private traffic controller 90 looks for an acknowledgement message in outgoing packets that acknowledges the INDX1=5 message, and finds the Ack_Indx1 message in the DSCP bits in the outgoing request packet. Once this acknowledgement messaged is received, private traffic controller 90 intercepts another return packet with the destination IP address matching source traffic controller 50, and changes the DSCP bits in this third return packet to indicate a second index value, such as INDX2=3.

When source traffic controller 50 receives the third return packet, it extracts the message INDX2=3 and stores 3 for the value of index 3. Source traffic controller 50 generates an acknowledgement message for index 2, Ack_Indx2, and embeds it into another outgoing request packet, a third outgoing packet, which is later intercepted by private traffic controller 90.

Private traffic controller 90 looks for an acknowledgement message in outgoing packets that acknowledges the INDX2=3 message, and finds the Ack_Indx2 message in the DSCP bits in the third outgoing packet. Once this acknowledgement messaged is received, private traffic controller 90 intercepts another return packet with the destination IP address matching source traffic controller 50, and changes the DSCP bits in this fourth return packet to indicate a policy-data value, such as Policy_Rule. Policy_Rule can be attributes for the policy selected by the first and second index values, such as enabling or disabling this policy, or a time duration that this policy is to remain in force before expiring. The first and second indexes may select a particular policy from a table of pre-set policy actions.

When source traffic controller 50 receives the fourth return packet, it extracts the message Policy_Rule. Source traffic controllers 50 can store the value Policy_Rule at a location indicated by index (1,2) values (5,3), or may activate or disable the policy that is indicated by index (1,2) values of (5,3). Other variations of the meaning and use of indexes and values may be substituted, and different numbers of packets may be exchanged.

Source traffic controller 50 then generates an acknowledgement message for Policy_Rule, Ack_Rule, to indicate that it is implementing this rule for future packet transmissions. This acknowledgement message is embedded into another outgoing request packet, a fourth outgoing packet, which is later intercepted by private traffic controller 90. Private traffic controller 90 can reset its state machine or other state-tracking for this source traffic controller 50 and its IP address.

Alternate Embodiments

Several other embodiments are contemplated by the inventors. For example a single policy-setting message may be sent from private traffic controller 90 to source traffic controllers 50, with or without any acknowledgement message from each one of source traffic controllers 50. A series of messages, either uni-directional or with acknowledgements, could be used, such as shown in FIG. 9. Acknowledgement messages could repeat the policy data received back to private traffic controller 90, or could return a checksum of the policy data or just an acknowledgement that some message was received, or acknowledge the type of message received.

Each message may carry only 1 bit of information when a series of messages is used, or may carry 4 bits or some other number of bits of useful information. To exchange 16 bits of policy information may require 16 messages when only 1 bit is available per message, or 4 messages when 4 bits per message are available. The degree of reliability can be traded off against the number of useful bits of policy information transferred. Check bits or other error-checking information could also be added. Information could be transferred in parallel using several packets between private traffic controller 90 and each source traffic controller 50 that are transmitted in a parallel or somewhat parallel fashion. Private traffic controller 90 may use more bits for signaling policy messages in the header of an IPv6 packet and fewer bits in the header of an IPv4 packet.

For reliable transfers using DSCP or other available bits, a signaling protocol could have a minimum of 3 bits. These bits may be in the DSCP header in the case of IPv4, or in any other unused locations in any header in any network protocol. The location of the minimum 3 bits may vary. Each different physical network may have different bit locations. For IPv4 DSCP bits may be used. The high order bit may be used for control. When the high order bit is set, the next two bits are used to form four unique control codes. The three control messages may be defined as: 11=start, 10=stop, 01=success acknowledgement. Stop may be sent when a transmission error is detected. Start messages may be exchanged, followed by data transfers with the high order bit cleared, and followed by success acknowledgement or stop messages being exchanged. Every control or data transfer message may be explicitly acknowledged by the other side. The transmission of the last message is repeated until an acknowledge for the message arrives.

Data transfer is performed with the control bit (high order bit) set to 0. The next bit is used as the sequence bit. The first bit of data transferred starts with a sequence bit of 0. The last remaining bit(s) (this same protocol can be used with any number of available bits) contains the data itself. The sender sets the first sequence bit to 0 and sends the first data transfer message. The receiving side echoes back this message. Once the sending side receives the message, it sets the sequence bit to 1. Similarly, the sender sets the sequence bit to 0 if it was 1. Both sides continue to repeat the last message until the next valid message is received. If a STOP message is received, all transferred bits are discarded. If a SUCCESS message is received, all bits successfully received are sent to the next layer protocol, and the state of the connection is reset. In the reset state, all packets will go out with a STOP command until such a time as a START message is received.

To ensure reliable transport of data across the protocol described above in this alternate embodiment, a second protocol layer may be used. This second protocol layer consists of a checksum or other error detecting scheme. If the checksum is incorrect, the entire message is discarded and the simple protocol state (see above) is reset, causing STOP messages to be sent and the private traffic controller attempts retransmission of the message.

A table of policies may be pre-defined, with different DSCP values specifying different pre-defined policies in the table. Each entry in the table could be a single policy, or could be a container of multiple policies to implement together. The table might not be a physical table but only a list of policies or containers of policies that are defined. Policies need not be pre-defined. Policies can be distributed by any mechanism including by using the DSCP bits. All policies could be slowly transferred one DSCP bit at a time until an entire policy has been received and re-assembled at the source controller(s). The new policy could be activated using DSCP the signaling mechanism.

Multiple levels of filters may be imposed on packets in one or in both directions. Blocks may be combined with other blocks, split, merged, partitioned, etc. in a variety of ways in physical implementations. Functions may be performed in hardware, programmable logic, firmware, programmable processors, software, and various combinations.

Private cellular network 36 could be a cellular network using RF links with one or many base stations and may have many Internet edge devices and connections to the public Internet. Other kinds of networks could be substituted, both wireless and wired, for private cellular network 36, such as a cable network, an optical network, a WiFi network, a WiMax network, an Internet Service Provider (ISP), a satellite network, a Digital-Subscriber Lines (DSL) network, a company Intranet, quasi-public networks, metropolitan networks, local-area-networks (LAN's), wide-area-networks (WAN's), a phone company's private network, Source devices could be cell phones, personal digital assistants (PDA's), smart phones, combination devices, communicators, web-browsing appliances, computers, personal computers, televisions, set-top boxes, electric meters, security sensors, etc.

Private traffic controller 90 could be placed at each connection to the Internet in a large private network. Private traffic controller 90 could be located at the connection from the private network to an Internet Service Provider (ISP), or at a connection from the ISP to the Internet. Traffic from the private network could be funneled through one or more private traffic controllers 90 that operate independently of each other, or in concert with one another, either loosely or tightly coupled. Traffic monitors could be integrated with private traffic controller 90 or could be separate. A company network with many office locations could have one private traffic controller 90 at each remote office site, and another at a company headquarters site. Private traffic controller 90 at remote office sites could monitor and shape traffic that originates from that remote site, while private traffic controller 90 located at the company headquarters site could monitor aggregate traffic entering from all the remote office sites, and could instruct private traffic controllers 90 at the remote sites to reduce traffic to the headquarters site when congestion occurred at the headquarters site. Other hybrid scenarios are contemplated.

While the terms private cellular network and private network have been used, source traffic controllers 50 and private traffic controller 90 could be located on quasi-public or public networks, or on branches or subsets of the public Internet or other networks. Composite networks could also use the source and private traffic controllers. Proprietary values for DSCP bits may become public or adopted in industry standards, and the exact values and mappings or encodings may change.

While placing the message to source traffic controllers 50 in the DSCP bits of the TOS or traffic class byte has been described, this message to source traffic controllers 50 could be embedded in other parts of the return packet, such as in the hop-limit byte or a hop-by-hop-destination-options field for IPv6 packets, or in other bits in the header or even in the data payload. The bits used do not have to be contiguous, but could be in separate bytes of the header. Reserved bits could be used for the in-band signaling. DiffServ or DSCP bits are not the only bits that could be used for the in-band-signaling.

Special packets could carry the message to source traffic controllers 50, but then additional packet traffic is created, and in-band signaling is no longer used. Such special packets could be used as a fail-safe or backup way to reach the source devices, such as when the source device sends no request packets at all.

Source traffic control without in-band signaling may still be useful. With in-band signaling, no additional packets are needed to signal policy changes. In pure in-band signaling, the size of the packets could increase to include the additional policy information. When piggybacking is combined with in-band signaling, the policy messages are encoded in the DSCP bits or in other bits of pre-existing packets. The policy messages are incorporated into existing packets (in-band), plus the packets do not increase in size (piggybacking).

Many other variations of the meaning and use of indexes and values may be substituted for the DSCP messages, and different numbers of packets may be exchanged. Multiple levels of messages may be exchanged, and the meaning of particular values of the DSCP bits may vary with each level.

While dropping of IP packets has been described, other kinds of packets or units of data may be dropped, such as TCP, FTP, flows, datagrams, frames, or other data units or capsules. Other types of policies might include monitoring applications and sending alerts if certain conditions are met, counting bytes and not allowing more than a certain number of bytes per time period, compressing, encrypting, and or accelerating some types of traffic.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method for controlling packet traffic on a private network by in-band signaling of policy information to a source device via existing network packets, the method comprising:
   (a) sending, by a server via a private network, one or more return packets to a source traffic controller executing on a source device;
   (b) detecting, by a private network monitor, a status of congestion of the private network;
   (c) determining, by a private traffic controller, to send a network policy to the source traffic controller responsive to the detection, the network policy comprising a new policy for future packets transmitted via the source traffic controller;
   (d) intercepting, by the private traffic controller, the one or more return packets;
   (e) modifying, by the private traffic controller, one or more Differentiated Services Code Point (DSCP) bits in the one or more return packets to embed a message identifying non-DSCP traffic control instructions for the network policy while maintaining a size of the one or more return packets, the modified one or more DSCP bits not setting priority of the one or more modified return packets;
   (f) sending, by the private traffic controller, the one or more modified return packets to the source traffic controller; and
   (g) receiving, by the private traffic controller, an acknowledgement of the network policy from the source traffic controller, the source traffic controller modifying the one or more DSCP bits of the one or more return packets to the server to identify the acknowledgement.

2. The method of claim 1, further comprising detecting, by the source traffic controller, that the one or more modified return packets comprise the message.

3. The method of claim 2, further comprising adjusting, by the source traffic controller, a local network policy responsive to the network policy of the message.

4. The method of claim 1, wherein step (c) further comprises generating, by the private traffic controller, the network policy responsive to the status of the network.

5. The method of claim 1, wherein step (b) further comprises detecting, by the private network monitor, an increase in congestion.

6. The method of claim 1, wherein step (b) further comprises detecting, by the private network monitor, a decrease in congestion.

7. The method of claim 1, wherein the one or more DSCP bits do not indicate a priority of a current network packet.

8. The method of claim 1, wherein step (e) further comprises modifying, by the private traffic controller, the one or more DSCP bits to embed the message to identify the network policy to control traffic at the source device.

9. The method of claim 1, wherein step (e) further comprises modifying, by the private traffic controller, the one or more DSCP bits to embed the message to identify the network policy instructing the source traffic controller to one of stop or reduce transmission rates of future packets.

10. A system for controlling packet traffic on a private network by in-band signaling of policy information to a source device via existing network packets, the system comprising:
    a server sending via a private network one or more return packets to a source traffic controller executing on a source device;
    a private network monitor detecting a status of congestion of the private network;
    a private traffic controller determining to send a network policy to the source traffic controller responsive to the detection and intercepting the one or more return packets, the network policy comprising a new policy for future packets transmitted via the source traffic controller;
    a packet modifier modifying one or more Differentiated Services Code Point (DSCP) bits in the one or more return packets to embed a message identifying non-DSCP traffic control instructions for the network policy while maintaining a size of the one or more return packets, the modified one or more DSCP bits not setting priority of the one or more modified return packets; and
    wherein the private traffic controller sends the one or more modified return packets to the source traffic controller and receives an acknowledgement of the policy from the source traffic controller, the source traffic controller modifying one or more DSCP bits of one or more return packets to the server to identify the acknowledgement.

11. The system of claim 10, wherein the source traffic controller detects that the one or more modified return packets comprise the message.

12. The system of claim 11, wherein the source traffic controller adjusts a local policy for controlling traffic responsive to the network policy of the message.

13. The system of claim 10, wherein the private traffic controller generates the network policy responsive to the status of the network.

14. The system of claim 10, wherein the private network monitor detects an increase in congestion of the private network.

15. The system of claim 10, wherein the private network monitor detects a decrease in congestion.

16. The system of claim 10, wherein the one or more DSCP bits do not indicate a priority of a current network packet.

17. The system of claim 10, wherein the packet modifier modifies the one or more DSCP bits to embed the message to identify the policy to control traffic at the source device.

18. The system of claim 10, wherein the packet modifier modifies the one or more DSCP bits to embed the message to identify the network policy instructing the source traffic controller to one of stop or reduce transmission rates of future packets.

19. A method for controlling packet traffic on a private network by in-band signaling of policy information to a source device via existing network packets, the method comprising:

(a) sending, by a server via a private network, one or more return packets to a source traffic controller executing on a source device;

(b) detecting, by a private network monitor, a status of congestion of the private network;

(c) determining, by a private traffic controller, to send a network policy to the source traffic controller responsive to the detection, the network policy comprising a policy to modify a rate of transmission of future packets transmitted via the source traffic controller;

(d) intercepting, by the private traffic controller, the one or more return packets;

(e) modifying, by the private traffic controller, one or more Differentiated Services Code Point (DSCP) bits in the one or more return packets to embed a message identifying the network policy while maintaining a size of the one or more return packets; and (f) sending, by the private traffic controller, the one or more modified return packets to the source traffic controller;

(g) extracting, by the source traffic controller, the embedded message in the DSCP bits from the one or more modified return packets, the embedded message comprising a non-DSCP traffic control instruction; and (h) implementing, by the source traffic controller, the non-DSCP traffic control instruction of the network policy derived from the embedded message; and (i) receiving, by the private traffic controller, an acknowledgement of the network policy from the source traffic controller, the source traffic controller modifying the one or more DSCP bits of the one or more return packets to the server to identify the acknowledgement.

* * * * *